United States Patent
Lin et al.

(10) Patent No.: US 10,947,417 B2
(45) Date of Patent: Mar. 16, 2021

(54) THERMAL-CURABLE ADHESIVE COMPOSITION AND ADHESIVE SHEET

(71) Applicant: TAIMIDE TECH. INC., Hsinchu (TW)

(72) Inventors: Chih-Wei Lin, Hsinchu (TW); Chun-Ting Lai, Hsinchu (TW)

(73) Assignee: TAIMIDE TECH. INC., Hsinchu (TW)

( * ) Notice: Subject to any disclaimer, the term of this patent is extended or adjusted under 35 U.S.C. 154(b) by 363 days.

(21) Appl. No.: 15/719,624

(22) Filed: Sep. 29, 2017

(65) Prior Publication Data
US 2019/0100679 A1   Apr. 4, 2019

(51) Int. Cl.
| | |
|---|---|
| C09J 4/06 | (2006.01) |
| C09J 7/02 | (2006.01) |
| B32B 7/12 | (2006.01) |
| C09J 7/29 | (2018.01) |
| C09J 7/30 | (2018.01) |
| C08F 265/06 | (2006.01) |

(52) U.S. Cl.
CPC ............... C09J 4/06 (2013.01); B32B 7/12 (2013.01); C08F 265/06 (2013.01); C09J 7/0203 (2013.01); C09J 7/29 (2018.01); C09J 7/30 (2018.01); B32B 2305/72 (2013.01); B32B 2309/105 (2013.01); C09J 2203/326 (2013.01); C09J 2301/312 (2020.08); C09J 2301/314 (2020.08); C09J 2433/00 (2013.01); C09J 2451/00 (2013.01); C09J 2479/086 (2013.01)

(58) Field of Classification Search
CPC .............. C09J 4/06; C09J 7/0203; B32B 7/12
See application file for complete search history.

(56) References Cited

U.S. PATENT DOCUMENTS

| | | | | |
|---|---|---|---|---|
| 2003/0194523 A1* | 10/2003 | Kume | ...................... | G09F 3/10 428/40.1 |
| 2006/0188711 A1* | 8/2006 | Kishioka | ................ | C09J 133/12 428/343 |
| 2009/0065140 A1* | 3/2009 | Osoegawa | ............. | C09J 175/16 156/275.5 |

FOREIGN PATENT DOCUMENTS

| | | |
|---|---|---|
| JP | 2016029701 A | 3/2016 |
| KR | 10-1283485 B1 | 7/2013 |
| KR | 10-2014-0039041 A | 3/2014 |
| KR | 1020170040830 A | 4/2017 |
| TW | 200932856 A | 8/2009 |
| TW | 201722711 A | 7/2017 |
| WO | 2016013310 A1 | 1/2016 |

* cited by examiner

*Primary Examiner* — Samir Shah
*Assistant Examiner* — Tong Guo
(74) *Attorney, Agent, or Firm* — Li & Cai Intellectual Property (USA) Office

(57) ABSTRACT

The instant disclosure provides a thermal-curable adhesive composition and adhesive sheet. The thermal-curable adhesive composition has a rate of change of adhesion ranging from 80% to 98% and defined by the following equation: $V=[(V0-V1)/V0]\times 100$, wherein V is the rate of change of adhesion of the thermal-curable adhesive composition, V0 is the adhesion of the thermal-curable adhesive composition under room temperature, and V1 is the adhesion of the thermal-curable adhesive composition after being heated to a predetermined temperature then cooled to the room temperature.

11 Claims, No Drawings

THERMAL-CURABLE ADHESIVE COMPOSITION AND ADHESIVE SHEET

BACKGROUND

1. Technical Field

The instant disclosure relates to an adhesive composition and an adhesive sheet using the adhesive composition, and in particular, to a thermal-curable adhesive composition and an adhesive sheet using the thermal-curable adhesive composition.

2. Description of Related Art

In the existing art, adhesive materials such as adhesive sheets are widely used in the manufacturing process of various products (such as semiconductor chips). For example, an adhesive material can be used in a form of an adhesive sheet employed in the cutting process of the semiconductor chips. Therefore, when the adhesive sheet is used for assisting the cutting process of the semiconductor chip, the adhesion thereof must be sufficient to attach and adhere to the semiconductor chip without separating from the semiconductor chip (i.e., without peeling). In addition, after the cutting process is completed and the semiconductor chip is subjected to a pick-up process, the adhesive sheet should be easily separated from the semiconductor chip. Accordingly, the adhesive sheets used in the manufacturing process of the semiconductor chips must have excellent adhesion during the cutting process and excellent peeling property during the pick-up process.

The adhesive sheets in the existing art have increased adhesion after being processed, for example, after being heated (during a high temperature process). Therefore, increased peeling-transfer pollutions or adhesive residue may be presented or generated on the target product (the object being attached or adhered).

In order to solve the above problems, functional groups with optical-curable property are introduced into a polymer of an adhesive material for producing an adhesive sheet. After the cutting process of the semiconductor chip is completed, the adhesive sheet is irradiated by light and cured, and hence, the adhesion thereof is reduced. Therefore, the adhesive sheet can be removed (peeled) from the cut semiconductor chip easily at specific time.

However, additional equipment such as radiation equipment is essential for irradiating the optical-curable adhesive sheet, and additional processing station is also required during the manufacturing process. Therefore, the manufacturing cost is increased and the manufacturing efficiency is reduced. In addition, generally, ultra-violet light is presented in the storing or working environment, and hence, the adhesion of the optical-curable adhesive sheets may be affected by light in the environment. In other words, the optical-curable adhesive sheets in the existing art are hard to store or preserve.

Accordingly, the adhesive composition used for protecting or fixing the surfaces of the target objects in the existing art needs to be improved.

SUMMARY

The main object of the instant disclosure is to provide a thermal-curable adhesive composition and an adhesive sheet using the same. The adhesive sheet can be easily peeled off from an object under a selected temperature. Specifically, a heating process in the original manufacturing process can be used to reduce the adhesion of the thermal-curable adhesive composition, thereby enabling the adhesive sheet to be easily removed from the object. In addition, the amount of the peeling transfer pollution on the object is minimized and the generation of the adhesive residue can be prevented.

An embodiment of the instant disclosure provides a thermal-curable adhesive composition having a rate of change of adhesion ranging from 80% to 98% and defined by the following equation: $V=[(V0-V1)/V0] \times 100$, in which V is the rate of change of adhesion of the thermal-curable adhesive composition, V0 is an adhesion of the thermal-curable adhesive composition under room temperature, and V1 is the adhesion of the thermal-curable adhesive composition after being heated to a predetermined temperature then cooled to the room temperature.

Another embodiment of the instant disclosure provides an adhesive sheet comprising a base film and an adhesive layer disposed on the base film. The adhesive layer is formed by a thermal-curable adhesive composition having a rate of change of adhesion ranging from 80% to 98% and defined by the following equation: $V=[(V0-V1)/V0] \times 100$, in which V is the rate of change of adhesion of the thermal-curable adhesive composition, V0 is the adhesion of the thermal-curable adhesive composition under room temperature, and V1 is the adhesion of the thermal-curable adhesive composition after being heated to a predetermined temperature then cooled to the room temperature.

One of the advantages of the instant disclosure is that the thermal-curable adhesive composition and the adhesive sheet provided by the instant disclosure can have reduced adhesion after being heated during a high temperature heating step in the manufacturing process of the attached product (such as a semiconductor chip) based on the technical feature of "the thermal-curable adhesive composition has a rate of change of adhesion ranging from 80% to 98% and defined by the following equation: $V=[(V0-V1)/V0] \times 100$, in which V is the rate of change of adhesion of the thermal-curable adhesive composition, V0 is an adhesion of the thermal-curable adhesive composition under room temperature, and V1 is the adhesion of the thermal-curable adhesive composition after being heated to a predetermined temperature then cooled to the room temperature". Accordingly, the adhesive sheet provided by the instant disclosure can be easily peeled-off without increasing the cost and the complexity of the manufacturing process.

In order to further understand the techniques, means and effects of the instant disclosure, the following detailed descriptions are hereby referred to, such that, and through which, the purposes, features and aspects of the instant disclosure can be thoroughly and concretely appreciated.

DESCRIPTION OF THE EXEMPLARY EMBODIMENTS

The embodiments of the instant invention are described hereunder through specific examples, and persons skilled in the art may easily understand other advantages and efficacies of the instant invention from the contents disclosed in the present description. The instant invention may be further implemented or applied through other different specific embodiments, and various modifications or amendments may also be made to each of the details in the present description based on different perspectives and applications without departing from the spirit of the instant invention.

The thermal-curable adhesive composition provided by the embodiments of the instant disclosure includes a base polymer, at least a thermal-curable group and a thermal curing agent. The components mentioned above are described in details herein.

Base Polymer

The base polymer includes at least a structural unit derived from at least a monomer. The monomer is an acryloyl group having a polymerizable carbon-carbon double bond or a methacryloyl group having a polymerizable carbon-carbon double bond. In the following description, the acryloyl group having a polymerizable carbon-carbon double bond and the methacryloyl group having a polymerizable carbon-carbon double bond are referred to as "monomers having polymerizable carbon-carbon double bond".

In addition, the monomer for forming at least one of the structural units of the base polymer, for example, a methacryloyl group containing a polymerizable carbon-carbon double bond, can be a methacrylate which is a saturated hydrocarbon compound. The saturated hydrocarbon compound may include an alkyl group, a cycloalkyl group or a combination thereof. For example, the saturated hydrocarbon compound can be an alkyl(meth)acrylate or a cyloalkyl (meth)acrylate. The alkyl group can be a methyl group, an ethyl group, a butyl group, an octyl group, a 2-ethylhexyl group, a decyl group, a dodecyl group, a tridecyl group or an octadecyl group. The cycloalkyl group can be a cyclopropyl group, a cyclobutyl group or a cyclohexyl group.

In addition, the monomers for forming the base polymer of the instant disclosure can also include other polymerizable monomers, for example, carboxyl group-containing monomers such as acrylic acid, methacrylic acid, carboxyl ethyl methacrylate and carboxyl hexyl methacrylate; hydroxyl group containing monomers such as 2-hydroxyethyl (meth)acrylate, 2-hydroxypropyl (meth)acrylate, 4-hydroxypropyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcyclohexyl) methyl (meth) acrylate; monomers containing nitrogen on the side chain such as (meth)acrylamide, N-hydroxymethyl (meth)acrylamide, (meth)acrylates (such as dimethylaminoethyl methacrylate, butoxybutyl methacrylate, etc.), acryloylmorpholine, acrylonitrile and N, N-dimethylacrylamide; alkyl group-containing monomers such as methoxyethyl (meth)acrylate and ethoxyl (meth)acrylate; sulfonic acid group-containing monomers such as 2-(meth)acrylamide-2-methylpropanesulfonic acid, (meth)acrylamide propanesulfonic acid, sulfopropyl methacrylate and (meth)acryloyloxy naphthalenesulfonic acid; phosphate groups-containing monomers such as 2-hydroxyethyl acrylate; acrylamide and acrylonitrile. Specifically, when the base polymer includes structural units derived from the monomers mentioned above, the physical property, such as the cohesion and the thermal-resistance of the base polymer is improved. The use of the monomers mentioned above can prevent the generation of the residue of the adhesive, and prevent the occurrence of the adhesive failure when the product containing the base polymer is in use. In addition, the product is able to withstand different heating environments.

The polymerizable monomers mentioned above can be used individually or in combination with each other to form the structural units of the base polymer. In other words, in an embodiment of the instant disclosure, two or more polymerizable monomers are used to form the structural units of the base polymer. In an embodiment of the instant disclosure, the monomers for forming the structural unit of the base polymer only include acrylic acid based monomers or only include methacrylic acid based monomers.

In addition, among the monomers for forming the structural units of the base polymer, multi-functional monomers can be used for conducting highly crosslinking reaction in the polymerization process. For example, the multifunctional monomer can be hexanediol di(meth)acrylate, (poly) ethylene glycol di(meth)acrylate, (poly)propylene glycol di(meth)acrylate, neopentyl glycol di(meth)acrylate, pentaerythritol di(meth)acrylate, trimethylolpropane tri(meth) acrylate, pentaerythritol tri(meth)acrylate, dipentaerythritol hexa(meth)acrylate, epoxy(meth)acrylate, polyester (meth) acrylate or (meth)acrylic carbamate.

Similarly, the multifunctional groups can be used individually or in combination with each other. Alternatively, the monomers for forming the structural units of the base polymer only include acrylic acid based monomer or only include methacrylic acid based monomer. Based on the use of multifunctional monomer, the base polymer can have improved coherence and thermal-resistance.

Accordingly, as an adhesive gel, the base polymer can have enhanced cohesion. When using different high temperature curing reacting agents having different decomposition temperatures, the adhesive sheet provided by the instant disclosure can be subjected to high temperature manufacturing process and exhibit good peeling effect, and the amount of contaminant on the surface of the product can be reduced.

As mentioned above, the base polymer of the instant disclosure can be formed using one type of monomer through polymerization reaction, or using more than two types of monomers through polymerization reaction. The polymerization reaction can be a solution polymerization, an emulsion polymerization, a mass polymerization or a suspension polymerization.

The base polymer formed by the polymerization process can have a weight average molecular weight of more than 200,000. Preferably, the base polymer of the instant disclosure has a weight average molecular weight ranging from 800,000 to 3,500,000. The weight average molecular weight is measured and calculated by a gel permeation chromatograph (GPC is used for measuring, and polystyrene is used as the standard sample).

The base polymer having a weight average molecular weight mentioned above can have a relatively low oligomer content. Therefore, when the thermal-curable adhesive composition including the base polymer is subjected to a thermal-curing process and is peeled-off from the surface of the object, the contaminant remained on the surface of the object can be significantly reduced. Specifically, based on the selection of the monomers for forming the base polymer, the base polymer can have a relatively high molecular weight. Therefore, the physical properties of the base polymer can be improved, for example, the base polymer can produce minimum gel residue on the object and have excellent heat resistance. In the base polymer, the low-molecular weight moieties are not likely to move within the adhesive, thereby ensuring the stability of the thermal-curable adhesive composition. In contrast thereto, if the base polymer has a relatively low molecular weight, the low-molecular weight moieties in the adhesive product will produce detrimental effect toward the thermal-curable adhesive composition.

Thermal-Curable Group

In the embodiments of the instant disclosure, the thermal-curable group and the base polymer can cooperate with each other to achieve the object of the instant disclosure. Specifically, the at least one thermal-curable group included in the thermal-curable adhesive composition provided by the instant disclosure is a group contributed to the high temperature curing process. The thermal-curable group can be the same functional group as the monomer having polymerizable carbon-carbon double bond of the structural unit of the base polymer. For example, the thermal-curable group can also contain polymerizable carbon-carbon double bond.

In addition, the thermal-curable group can be presented in the thermal-curable adhesive composition in the form of a monomer having the thermal-curable group, or in the form of an oligomer having the thermal-curable group. In other words, the thermal-curable group can be presented in the form of a monomer or an oligomer having polymerizable carbon-carbon double bond.

In the instant disclosure, the thermal-curable group can be presented in the side chain of the base polymer by bonding. Alternatively, the thermal-curable group can be provided by an oligomer having thermal-curable groups which is additionally added to the composition. In other words, at least one of the structural units of the base polymer can be derived from a monomer having a thermal-curing group and the structural unit is located at the side chain of the base polymer. In another embodiment, an oligomer having the thermal-curable group is added without changing the structure of the base polymer. In the exemplified embodiment of the instant disclosure, the thermal-curable group is introduced by adding an oligomer having a thermal-curable group.

The thermal-curable group used in the embodiments of the instant disclosure can be derived from a monomer having a thermal-curable group which is an acryloyl group having a polymerizable carbon-carbon double bond or a methacryloyl group having polymerizable carbon-carbon double bond. Alternatively, the thermal-curable group is derived from an oligomer of the monomers having the thermal-curable group. For example, the thermal-curable group used in the embodiments of the instant disclosure can be derived from pentaerythritol tri(meth)acrylate, dipentaerythritol hexa(meth) acrylate, tetraethylene glycol di(meth)acrylate, trimethylolpropane tri(meth) acrylate, 1,6-hexanediol (meth)acrylate, neopentyl glycol di(meth) acrylate or the ester product of (meth)acrylic acid and a polyol; ester-acrylate oligomer; 2-acryloyl-3-butylcyanurate; or isocyanurate and the derivatives thereof.

In the embodiments of the instant disclosure, the thermal-curable group can be formed by only one type of the above compounds or formed by more than two of the above compounds.

In addition, when an oligomer derived from a monomer having thermal-curable group is used for forming the thermal-curable group in the thermal-curable adhesive composition, the content of the oligomer is not limited in the instant disclosure. However, in order to control the adhesion toward the object of the thermal-curable adhesive composition after the high temperature process to be within a predetermined range, based on the weight of the base polymer in the thermal-curable adhesive composition, the amount of the polymerizable carbon-carbon double bond in the monomer having the thermal-curable group is ranging from 0.2 to 10%, preferably ranging from 1 to 5%, and most preferably from 3 to 3.6%. Within the above ranges, the amount of the thermal-curable group in the thermal-curable adhesive composition can be selected. The position of the thermal-curable groups can be selected and designed based on actual need.

Thermal Curing Agent

The thermal curing agent used in the thermal-curing adhesive composition provided by the instant disclosure can be a high temperature curing reacting agent. The high temperature curing reacting agent can undergo a chemical reaction under a high temperature process for reducing the adhesion of the thermal-curable adhesive composition. The thermal curing agent used in the instant disclosure is listed in Table 1 below along with the decomposition temperature thereof.

TABLE 1

| Compound | Name | Decomposition temperature (° C.) |
|---|---|---|
| 2,2'-Azobis(2-methylbutyronitrile) | thermal curing agent 1 | 66 |
| 2,5-Dimethyl-2,5-di(2-ethylhexanoylperoxy)hexane | thermal curing agent 2 | 68 |
| 1,1,3,3-Tetramethylbutyl peroxy-2-ethylhexanoate | thermal curing agent 3 | 69 |
| tert-Amyl peroxy-2-ethylhexanoate | thermal curing agent 4 | 73 |
| Benzoyl peroxide | thermal curing agent 5 | 71 |
| tert-Butyl peroxy-2-ethylhexanoate | thermal curing agent 6 | 72 |
| tert-butyl 2-ethylperoxybutyrate | thermal curing agent 7 | 75 |
| tert-Butyl peroxyisobutyrate | thermal curing agent 8 | 79 |
| 1,1'-Azobis(cyanocyclohexane) | thermal curing agent 9 | 85 |
| 1,1-Di-(tert-butylperoxy)-3,3,5-trimethylcyclohexane | thermal curing agent 10 | 85 |
| 1,1-di(tert-amylperoxy)cyclohexane | thermal curing agent 11 | 87 |
| 1,1-Di(tert-butylperoxy)cyclohexane | thermal curing agent 12 | 94 |
| tert-amylperoxy 2-ethylhexyl carbonate | thermal curing agent 13 | 95 |
| tert-Amyl peroxyacetate | thermal curing agent 14 | 96 |
| tert-Butyl peroxy-3,5,5-trimethylhexanoate | thermal curing agent 15 | 94 |
| 2,2-Di(tert-butylperoxy)butane | thermal curing agent 16 | 98 |
| tert-Butylperoxy isopropyl carbonate | thermal curing agent 17 | 98 |
| tert-Butylperoxy 2-ethylhexyl carbonate | thermal curing agent 18 | 98 |
| tert-Amyl peroxybenzoate | thermal curing agent 19 | 99 |
| tert-Butyl peroxyacetate | thermal curing agent 20 | 100 |
| Butyl 4,4-bis(tert-butyldioxy)valerate | thermal curing agent 21 | 102 |
| tert-Butyl peroxybenzoate | thermal curing agent 22 | 103 |
| Dicumyl peroxide | thermal curing agent 23 | 112 |
| Di(tert-butylperoxyisopropyl)benzene | thermal curing agent 24 | 114 |
| 2,5-Dimethyl-2,5-di(tert-butylperoxy)hexane | thermal curing agent 25 | 115 |
| tert-Butyl cumyl peroxide | thermal curing agent 26 | 115 |
| 2,5-Dimethyl-2,5-di(tert-butylperoxy)hexyne-3 | thermal curing agent 27 | 120 |
| Di-tert-butyl peroxide | thermal curing agent 28 | 121 |
| 3,6,9-triethy-3,6,9-trimethyl-1,4,7-triperoxynonane | thermal curing agent 29 | 125 |
| 3,5-Diisopropylbenzene hydroperoxide | thermal curing agent 30 | 129 |
| 1,1,3,3-Tetramethylbutyl hydroperoxide | thermal curing agent 31 | 140 |
| 3,3,5,7,7-pentamethyl-1,2,4-Trioxepane | thermal curing agent 32 | 147 |
| Cumyl hydroperoxide | thermal curing agent 33 | 140 |

TABLE 1-continued

| Compound | Name | Decomposition temperature (° C.) |
|---|---|---|
| tert-Butyl hydroperoxide | thermal curing agent 34 | 164 |
| tert-Amyl hydroperoxide | thermal curing agent 35 | 153 |
| 2,3-Dimethyl-2,3-diphenylbutane | thermal curing agent 36 | 237 |

The use of the thermal curing agent enables the thermal-curable adhesive composition provided by the embodiments of the instant disclosure to undergo polymerization reaction initiated by heat through a heating step. The heat source used in the instant disclosure can be an electrical wave, an electron beam, infrared light, visible light, ultraviolet light, an X-ray or a γ ray. However, the heating source used in the instant disclosure is not limited thereto. The heat can be also provided by a hot air oven, a halogen lamp, microwave heating, a stove or steam heat conduction.

It should be noted that temperature of the heating step is higher than the decomposition temperature of the thermal curing agent, and the heating time is more than 5 minutes. In addition, using a temperature that is 20° C. higher than the decomposition temperature of the thermal curing agent can ensure the thermal-curing effect of the thermal-curable adhesive composition.

For example, when using the thermal curing agent 28 in Table 1 as the thermal curing agent, the heating temperature of the high temperature heating step is higher than 121° C. and the time is more than 5 minutes. Preferably, the heating temperature is more than 141° C. Therefore, the thermal-curable adhesive composition can be completely cured after subjected to the heating step.

Other Additives

The thermal-curable adhesive composition provided by the embodiment of the instant disclosure can include a thermal polymerization initiator for initiating the polymerization reaction of the base polymer. The thermal polymerization initiator can be benzoyl peroxide, Azobisisobutyronitrile (AIBN) or the mixture thereof.

Based on 100 parts of the base polymer, the amount of the thermal polymerization initiator is ranging from 0.1 to 20 parts by weight; preferably, the amount of the thermal polymerization initiator is ranging from 0.5 to 10 parts by weight.

The thermal-curable adhesive composition provided by the embodiments of the instant disclosure has a specific rate of change of adhesion while using as a sheet material (an adhesive sheet). Specifically, the rate of change of adhesion of the thermal-curable adhesive composition provided by the embodiment of the instant disclosure is defined by the following equation:

$$V=[(V0-V1)/V0] \times 100$$

In the above equation, V is the rate of change of adhesion of the thermal-curable adhesive composition and is ranging from 80% to 98%, V0 is the adhesion of the thermal-curable adhesive composition under room temperature, and V1 is the adhesion of the thermal-curable adhesive composition after being heated to a predetermined temperature then cooled to room temperature.

In the embodiments of the instant disclosure, room temperature is a temperature ranging from 22 to 26° C., and the predetermined temperature can be selected based on the thermal curing agent in the adhesive composition. For example, when the thermal curing agent 1 in Table 1 is used, the predetermined temperature can be ranging from 66 to 71° C. In addition, the heating time can be at least 5 minutes. The adhesion of the thermal-curable adhesive composition after being heated to a predetermined temperature then cooled to room temperature can be less than 200 gf/inch.

An adhesive sheet is also provided by the instant disclosure. The adhesive sheet includes a base film and a film formed by the thermal-curable adhesive composition mentioned above. Therefore, the components of the thermal-curable adhesive composition are described above and are not reiterated herein.

The adhesive sheet provided by the instant disclosure can have different shapes. Specifically, the adhesive sheet can be an adhesive material in the form of a sheet or can be rolled to form an adhesive roll. In addition, the shape of the adhesive sheet can be changed based on the application, the object to be adhered or the parameters in the manufacturing process, and is not limited in the instant disclosure.

The base film included in the adhesive sheet is used to support the thermal-curable adhesive composition disposed thereon. The thickness of the base film can be ranging from 10 to 300 micrometers (μm), preferably, ranging from 30 to 200 micrometers.

In the instant disclosure, the base film can be a single-layer film or a multi-layer film. In other words, the base film can be formed by stacking different thin films made of different materials on top of each other. The material for forming the base film can be polymer materials such as polyolefin, for example, low density polyethylene, medium density polyethylene, high density polyethylene, ultra low density polyethylene, linear polyethylene, poly propylene random, block polypropylene, homopolypropylene, polybutene, polymethylpentene; ethylene-vinyl acetate copolymer, ionomer resin, ethylene-(meth)acrylic acid copolymers, random or alternating copolymers of ethylene (meth)acrylates, ethylene-butene copolymers, ethylene-hexene copolymers, polyurethanes, polyethylene terephthalate and the like, polyurethanes, polyether ketones, polystyrene, polyvinyl chloride, polyvinylidene chloride, fluororesin, polysilicate resin, cellulose resin and any mixture thereof. In addition, based on the needs of the manufacturing process and the property of the product, these materials can be used in combination with materials providing additional functions such as functional groups or functional monomers.

The base film of the adhesive sheet can have treated surface. Specifically, the base film can include two or more thin films. One of the thin films is a material layer containing metals (a conductive layer). For example, the surface of the base film can include a metal layer, an alloy layer or an oxidation layer of the metal or alloy coated thereon for providing conductivity. The material layer containing metal can be disposed on the surface of another thin film (a substrate layer) by an evaporation deposition process or an electrical plating process. In the embodiments of the instant disclosure, the thickness of the material layer containing metal is ranging from 3 to 50 nanometers. The thickness of the material layer containing metal (the conductive layer) is controlled within the above range to enable the base film including the conductive layer to have excellent antistatic property.

In addition, the surface of the base film can be treated to increase the strength of the attachment towards other layers. For example, a physical treatment or a chemical treatment can be carried out on the surface of the base film. The physical treatment and the chemical treatment can include an irradiation treatment, corona discharge treatment, undercoat treatment, coating treatment, crosslinking treatment, chromic acid treatment, ozone exposing treatment, flame exposing treatment, high pressure electricity exposing treatment or ionic radiation treatment, etc.

The adhesive layer in the adhesive sheet provided by the instant disclosure can be formed on the surface of the base film by a coating step or a transfer-printing step. For example, the thermal-curable adhesive composition can be directly coated onto the surface of the base film. In another embodiment, the thermal-curable adhesive composition can be coated on a surface of a temporary carrier with a releasing agent disposed thereon in advance. Afterwards, after the thermal-curable adhesive composition on the carrier is dried, the thermal-curable adhesive composition is transfer-printed onto the surface of the base film.

In the instant disclosure, the thickness of the adhesive can be ranging from 1 to 50 micrometers (μm). In practice, in order to ensure the adhesion of the adhesive sheet including the adhesive layer, the adhesive layer has a thickness more than 1 micrometer.

The adhesive sheet provided by the embodiments of the instant disclosure can include a releasing layer in addition to the base film and the adhesive film. The releasing layer can be disposed on the surface of the adhesive layer, and hence, the adhesive layer is disposed between the base film and the releasing layer. The releasing layer can have a thickness ranging from 10 to 200 micrometers and can be made of papers, polyethylene, polypropylene or polyethylene terephthalate. The releasing layer can protect and isolate the adhesive layer for preventing the adhesion of the adhesive layer from reducing under the influence of the storage environment.

In practice, in order to increase the function of the releasing layer, the releasing layer can be UV-resistant. Therefore, the adhesive layer of the adhesive sheet can be prevented from reacting under a storage environment including ultra-violet light. In addition, the surface of the releasing layer can be surface-treated (for example, undergo specific surface treatments) for easily removing the releasing layer from the adhesive layer. For example, the surface of the releasing layer can be modified. For example, a polysiloxane treatment, a long-chain alkyl treatment or a fluorine treatment can be carried out on the releasing layer.

The adhesive sheet provided by the embodiments of the instant disclosure can be used in the semiconductor industry. For example, the adhesive sheet can be used to attach onto the semiconductor chips or semiconductor packages. The materials of the objects to be attached by the adhesive sheet are not limited and can be metals, ceramics, and glass. Based on the experimental results, the adhesive provides by the embodiments of the instant disclosure can be suitably used as protecting or carrying adhesive sheets in flexible boards, rigid boards, flexible-rigid board, light-emitting diodes (LEDs) or semiconductor-related electronic industries.

After attaching the adhesive sheet onto the object for conducting specific manufacturing steps, a heating step originally existed in the manufacturing process of the object can be used to treat the adhesive layer before the adhesive sheet is removed from the object.

Generally, the heating step carried on the adhesive sheet can be from 5 to 30 minutes. In practice, the heating time is at least 5 minutes to ensure that the reduction of the adhesion of the adhesive layer is sufficient to separate the object (such as a chip) from the adhesive sheet. Therefore, the effect of easy to pick-up can be achieved.

The thermal-curable adhesive composition and the adhesive sheet are exemplified in the following experimental examples.

Preparation of the Precursors of the Base Polymer 500 grams (g) of ethyl acetate, 75 g of methyl acrylate, 40.5 g of 2-ethylhexyl acrylate and 2.2 g of acrylic acid are added into a common polymerization vessel including a one-litter (1 L) round-bottom flask connecting to a separating funnel, a thermometer, a nitrogen gas introducing tube, a condensing tube, a vacuum sealer, a stir bar and a stirring blade.

The thermal polymerization initiator for the precursor is 0.3 wt. % of AIBN based on the total amount of the monomers.

Nitrogen gas is introduced into the polymerization vessel and the solution temperature in the polymerization vessel is controlled under 65±2° C. by stirring and double-boiling. The reaction is carried out for 12 hours for obtaining the precursor solution.

Preparation of the Adhesive Solution

A high temperature thermal curing reacting agent, a curing oligomer having thermal curable groups such as monomers having commercial name of U-4HA or U-4H (manufactured by Shin Nakamura Chemical Co., Ltd. U-4HA is a multi-function monomer having acryloyl and U-4H is a multi-function monomer having methacryloyl groups), a polyisocyanate crosslinking agent and ethyl acetate are added into the above precursor solution. The resultant is stirred for obtaining an adhesive solution.

The polyisocyanate crosslinking agent (Coronate L, manufactured by Nippon Polyurethane Industry) is added in an amount of 2% based on the total amount of the monomers of the precursor.

Manufacturing of the Adhesive Sheet

The polymer solution (the adhesive solution) is coated onto the peeling surface of a PET film. The peeling surface is treated by polysiloxane compound in advance. The polymer solution is dried in a drying machine under 80° C. for 2 minutes. An adhesive layer having a thickness of 10 μm is obtained.

A commercial polyimide (PI) film (such as a polyimide film TL-025 manufactured by Taimide) is used as the base film. The surface of the base film is corona treated in advance. The thickness of the base film is 25 μm.

The adhesive layer is attached (adhered) to the corona treated surface of the base film by a hand press roller. A close processing step is carried out for 72 hours under 50° C. for producing the adhesive sheet.

Adhesion Test

The adhesive sheets are cut into 1 inch in width and 150 millimeters (mm) in length. A 2 kilograms roll is used to attach the adhesive sheet onto a polished steel plate under 23° C. (room temperature). The steel plate is mirror polished in advance and is cleaned by alcohol and acetone by a dust-free cloth and leave in stand for 1 hour.

Afterwards, the adhesives attached on the polished steel plate undergo high temperature steps under different temperatures and are peeled off from the steel plate under a peeling speed of 300 mm/minute and a peeling angle of 180 degrees. The adhesion (gf/1 inch) of each adhesive sheet is tested. The temperatures of the high temperature steps are selected based on the different thermal curing agents.

The amount of the thermal-curable groups and the species of the thermal curing agents in the experimental examples and comparative examples, and the results of the adhesion test are listed in Table 2. The amounts listed in Table 2 are calculated based on the total weight of the thermal-curable adhesive composition.

TABLE 2

| | thermal-curable adhesive composition | | adhesive sheet | | | |
|---|---|---|---|---|---|---|
| No. | thermal-curable group (%) | thermal curing agent (%) | initial adhesion V0 (gf/inch) | final adhesion V1 (gf/inch) | rate of change of adhesion V (%) | peeling off easily? |
| experimental examples | | | | | | |
| 1 | 3.6 | thermal curing agent 8 (0.5) | 1050 | 21 | 98.0 | O |
| 2 | 1.8 | thermal curing agent 8 (0.5) | 1023 | 103 | 89.9 | O |
| 3 | 0.2 | thermal curing agent 8 (0.5) | 997 | 192 | 80.7 | O |
| 4 | 1.8 | thermal curing agent 36 (0.5) | 988 | 87 | 91.2 | O |
| 5 | 4 | thermal curing agent 8 (0.5) | 1081 | 23 | 97 | O |
| comparative example | | | | | | |
| 1 | 1.8 | — | 1023 | 1021 | 0.1 | X |
| 2 | — | thermal curing agent 8 (0.5) | 1023 | 1018 | 0.4 | X |
| 4 | 0.1 | thermal curing agent 8 (0.5) | 1046 | 334 | 68 | X |
| 5 | 0.2 | thermal curing agent 8 (0.15) | 1135 | 213 | 81.2 | X |

In Table 2, the thermal curing agent 8 is tert-Butyl peroxyisobutyrate, and the thermal curing agent 36 is 2,3-Dimethyl-2,3-diphenylbutane.

As shown in Table 2, the thermal-curable adhesive compositions provided by the embodiments of the instant disclosure have good initial adhesions V0. In addition, the thermal-curable adhesive compositions exhibit excellent rate of change of adhesion after subjected to the high temperature heating steps.

In summary, the thermal-curable adhesive composition and the adhesive sheet provided by the instant disclosure can have reduced adhesion after heated by a high temperature heating step in the manufacturing process of the attached product (such as a semiconductor chip) based on the technical feature of "the thermal-curable adhesive composition has a rate of change of adhesion ranging from 80% to 98% defined by the following equation: $V=[(V0-V1)/V0]\times100$, in which V is the rate of change of adhesion of the thermal-curable adhesive composition, V0 is the adhesion of the thermal-curable adhesive composition under room temperature, and V1 is the adhesion of the thermal-curable adhesive composition after being heated to a predetermined temperature then cooled to the room temperature". Accordingly, the adhesive sheet provided by the instant disclosure can be easily peel-off without increasing the cost and the complexity of the manufacturing process.

Specifically, based on the temperature range in the manufacturing process of the object to be attached or the temperature of an additional processing step, a thermal curing agent having specific decomposition temperature in the thermal-curable adhesive composition and the adhesive sheet provided by the instant disclosure can be specifically selected. Therefore, the adhesion of the thermal-curable adhesive composition or the adhesive sheet can be controlled after subjected to the heating steps, thereby separating the adhesive sheet from the object.

For example, in a molding process, a thermal curing agent with a specific decomposition temperature is selected based on the temperature of the molding process (such as from 150 to 200° C.). In a reflow process, another thermal curing agent with a specific decomposition temperature is selected based on the temperature of the molding process (such as from 230 to 280° C.). Therefore, the thermal-curable adhesive composition and the adhesive sheet provided by the instant disclosure can be suitably used in different industries and manufacturing processes.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A thermal-curable adhesive composition including a base polymer, at least a thermal-curable group, and a thermal curing agent, wherein based on the weight of the base polymer, a polymerizable carbon-carbon double bond of the thermal-curable group has a content ranging from 0.2 to 10%;
    wherein the thermal-curable adhesive composition having a rate of change of adhesion ranging from 80% to 98% and defined by the following equation: $V=[(V0-V1)/V0]\times100$, wherein V is the rate of change of adhesion of the thermal-curable adhesive composition, V0 is an adhesion of the thermal-curable adhesive composition under room temperature, and V1 is the adhesion of the thermal-curable adhesive composition after being heated to a predetermined temperature then cooled to the room temperature;
    wherein the base polymer includes at least a structural unit derived from a monomer, the monomer being an acryloyl group containing the polymerizable carbon-carbon double bond or a methacryloyl group containing the polymerizable carbon-carbon double bond;
    wherein, the thermal-curable group is derived from pentaerythritol tri(meth)acrylate, dipentaerythritol hexa (meth) acrylate, tetraethylene glycol di(meth)acrylate, trimethylolpropane tri(meth) acrylate, 1,6-hexanediol (meth)acrylate, neopentyl glycol di(meth) acrylate or the ester product of (meth)acrylic acid and a polyol; ester-acrylate oligomer; 2-acryloyl-3-butylcyanurate; or isocyanurate and the derivatives thereof.

2. The thermal-curable adhesive composition according to claim 1, wherein the adhesion of the thermal-curable adhesive composition after being heated to the predetermined temperature then cooled to the room temperature is less than 200 gf/inch.

3. The thermal-curable adhesive composition according to claim 1, wherein the thermal-curable group is presented in the thermal-curable adhesive composition in a form of a monomer having the thermal-curable group or in a form of an oligomer having the thermal-curable group.

4. The thermal-curable adhesive composition according to claim 1, wherein the thermal-curable group is a methacryloyl group.

5. The thermal-curable adhesive composition according to claim 1, wherein the base polymer has a weight average molecular weight ranging from 200,000 to 3,500,000.

6. The thermal-curable adhesive composition according to claim 1, wherein the thermal curing agent is selected from the group consisting of: 2,2'-azobis(2-methylbutyronitrile), 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, benzoyl peroxide, tert-butyl peroxy-2-ethylhexanoate, tert-butyl 2-ethylperoxybutyrate, tert-butyl peroxyisobutyrate, 1,1'-azobis(cyanocyclohexane), 1,1-di-(tert-butylperoxy)-3,3,5-trimethylcyclohexane, 1,1-di(tert-amylperoxy)cyclohexane, 1,1-di(tert-butylperoxy)cyclohexane, tert-amylperoxy 2-ethylhexyl carbonate, tert-amyl peroxyacetate, tert-butyl peroxy-3,5,5-trimethylhexanoate, 2,2-di(tert-butylperoxy)butane, tert-butylperoxy isopropyl carbonate, tert-butylperoxy 2-ethylhexyl carbonate, tert-amyl peroxybenzoate, tert-butyl peroxyacetate, butyl 4,4-bis(tert-butyldioxy)valerate, tert-butyl peroxybenzoate, dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne-3, di-tert-butyl peroxide, 3,6,9-triethy-3,6,9-trimethyl-1,4,7-triperoxynonane, 3,5-diisopropylbenzene hydroperoxide, 1,1,3,3-tetramethylbutyl hydroperoxide, 3,3,5,7,7-pentamethyl-1,2,4-trioxepane, cumyl hydroperoxide, tert-butyl hydroperoxide, tert-amyl hydroperoxide, and 2,3-dimethyl-2,3-diphenylbutane.

7. An adhesive sheet, comprising:
a base film; and
an adhesive layer disposed on the base film and formed by a thermal-curable adhesive composition, the thermal-curable adhesive composition including a base polymer, at least a thermal-curable group and a thermal curing agent, wherein based on the weight of the base polymer, a polymerizable carbon-carbon double bond of the thermal-curable group has a content ranging from 0.2 to 10%;
wherein the thermal-curable adhesive composition has a rate of change of adhesion ranging from 80% to 98% and defined by the following equation: $V=[(V0-V1)/V0] \times 100$, wherein V is the rate of change of adhesion of the thermal-curable adhesive composition, V0 is an adhesion of the thermal-curable adhesive composition under room temperature, and V1 is the adhesion of the thermal-curable adhesive composition after being heated to a predetermined temperature then cooled to the room temperature;
wherein the base polymer includes at least a structural unit derived from a monomer, the monomer being an acryloyl group containing the polymerizable carbon-carbon double bond or a methacryloyl group containing the polymerizable carbon-carbon double bond;
wherein, the thermal-curable group is derived from pentaerythritol tri(meth)acrylate, dipentaerythritol hexa(meth) acrylate, tetraethylene glycol di(meth)acrylate, trimethylolpropane tri(meth) acrylate, 1,6-hexanediol (meth)acrylate, neopentyl glycol di(meth) acrylate or the ester product of (meth)acrylic acid and a polyol; ester-acrylate oligomer; 2-acryloyl-3-butylcyanurate; or isocyanurate and the derivatives thereof.

8. The adhesive sheet according to claim 7, wherein the base film includes a conductive layer and a substrate layer, the base film having a thickness ranging from 10 to 300 micrometers, the conductive layer having a thickness ranging from 3 to 50 nanometers.

9. The adhesive sheet according to claim 7, wherein the thermal-curable group is presented in the thermal-curable adhesive composition in a form of a monomer having the thermal-curable group or in a form of an oligomer having the thermal-curable group.

10. The adhesive sheet according to claim 7, wherein the thermal-curable group is a methacryloyl group.

11. The adhesive sheet according to claim 7, wherein the thermal curing agent is selected from the group consisting of: 2,2'-azobis(2-methylbutyronitrile), 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, benzoyl peroxide, tert-butyl peroxy-2-ethylhexanoate, tert-butyl 2-ethylperoxybutyrate, tert-butyl peroxyisobutyrate, 1,1'-azobis(cyanocyclohexane), 1,1-di-(tert-butylperoxy)-3,3,5-trimethylcyclohexane, 1,1-di(tert-amylperoxy)cyclohexane, 1,1-di(tert-butylperoxy)cyclohexane, tert-amylperoxy 2-ethylhexyl carbonate, tert-amyl peroxyacetate, tert-butyl peroxy-3,5,5-trimethylhexanoate, 2,2-di(tert-butylperoxy)butane, tert-butylperoxy isopropyl carbonate, tert-butylperoxy 2-ethylhexyl carbonate, tert-amyl peroxybenzoate, tert-butyl peroxyacetate, butyl 4,4-bis(tert-butyldioxy)valerate, tert-butyl peroxybenzoate, dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne-3, di-tert-butyl peroxide, 3,6,9-triethy-3,6,9-trimethyl-1,4,7-triperoxynonane, 3,5-diisopropylbenzene hydroperoxide, 1,1,3,3-tetramethylbutyl hydroperoxide, 3,3,5,7,7-pentamethyl-1,2,4-trioxepane, cumyl hydroperoxide, tert-butyl hydroperoxide, tert-amyl hydroperoxide, and 2,3-dimethyl-2,3-diphenylbutane.

* * * * *